United States Patent
Dittmar et al.

(10) Patent No.: US 9,732,801 B2
(45) Date of Patent: Aug. 15, 2017

(54) METHOD FOR MANUFACTURING AND ASSEMBLING A ROLLING-ELEMENT BEARING ASSEMBLY WITH A SPACER

(71) Applicants: Rico Dittmar, Schweinfurt (DE); Christian Knoche, Schweinfurt (DE); Achim Mueller, Dittelbrunn (DE); Thomas Will, Königsberg (DE)

(72) Inventors: Rico Dittmar, Schweinfurt (DE); Christian Knoche, Schweinfurt (DE); Achim Mueller, Dittelbrunn (DE); Thomas Will, Königsberg (DE)

(73) Assignee: AKTIEBOLAGET SKF, Gothenburg (SE)

( * ) Notice: Subject to any disclaimer, the term of this patent is extended or adjusted under 35 U.S.C. 154(b) by 29 days.

(21) Appl. No.: 13/966,724

(22) Filed: Aug. 14, 2013

(65) Prior Publication Data

US 2014/0050433 A1 Feb. 20, 2014

(30) Foreign Application Priority Data

Aug. 14, 2012 (DE) .................. 10 2012 214 422
Aug. 14, 2012 (DE) .................. 20 2012 103 063

(51) Int. Cl.

| F16C 43/04 | (2006.01) |
|---|---|
| F16C 35/067 | (2006.01) |
| F16C 19/54 | (2006.01) |
| F16C 19/36 | (2006.01) |
| F16C 19/56 | (2006.01) |

(52) U.S. Cl.
CPC ............ *F16C 43/04* (2013.01); *F16C 19/548* (2013.01); *F16C 35/067* (2013.01); *F16C 19/364* (2013.01); *F16C 19/56* (2013.01); *F16C 2226/40* (2013.01); *F16C 2229/00* (2013.01); *F16C 2326/02* (2013.01);
(Continued)

(58) Field of Classification Search
CPC ...... F16C 43/04; F16C 35/067; F16C 19/548; F16C 19/56; F16C 2326/02; F16C 2229/00; F16C 2226/40; F16C 19/364; Y10T 29/49682; Y10T 29/49696; Y10T 29/497

See application file for complete search history.

(56) References Cited

U.S. PATENT DOCUMENTS

| 5,144,743 A * | 9/1992 | Kempas .................... 29/898.09 |
| 6,651,340 B2 | 11/2003 | Prater |
| 2011/0033147 A1 * | 2/2011 | Dittmar et al. ............... 384/551 |

FOREIGN PATENT DOCUMENTS

| DE | 3644270 A1 | 7/1987 |
| DE | 102009024988 A1 | 12/2010 |

(Continued)

*Primary Examiner* — Ryan J Walters
(74) *Attorney, Agent, or Firm* — Bryan Peckjian; SKF USA Inc. Patent Dept.

(57) ABSTRACT

A method for manufacturing a rolling-element bearing assembly includes providing a first bearing ring, a second bearing ring and rolling-elements, rotating the first bearing ring relative to the second bearing ring and joining the first bearing ring, the second bearing ring and the rolling elements while the first bearing ring is rotating relative to the second bearing ring. The method additionally includes connecting one of the bearing rings to a bearing ring of another rolling-element bearing or to a spacer while the first bearing ring is rotating relative to the second bearing ring.

12 Claims, 2 Drawing Sheets

(52) U.S. Cl.
CPC ........ *Y10T 29/497* (2015.01); *Y10T 29/49682* (2015.01); *Y10T 29/49696* (2015.01); *Y10T 156/10* (2015.01)

(56) References Cited

FOREIGN PATENT DOCUMENTS

| | | |
|---|---|---|
| DE | 102010033823 A1 | 2/2011 |
| DE | 102010021725 A1 | 12/2011 |
| EP | 0433725 A1 | 6/1991 |
| FR | 2633679 A1 | 1/1990 |

\* cited by examiner

METHOD FOR MANUFACTURING AND ASSEMBLING A ROLLING-ELEMENT BEARING ASSEMBLY WITH A SPACER

CROSS-REFERENCE TO RELATED APPLICATIONS

The present application claims priority to German patent application number 10 2012 214 422.6 and German utility model application no. 20 2012 103 063.2, both filed on Aug. 14, 2012, the contents of both of which are hereby incorporated by reference as if fully set forth herein.

FIELD OF THE INVENTION

Exemplary embodiments relate to the manufacture and design of bearings for machine parts that are moveable relative to one another, and, more specifically, to a method for manufacturing a rolling-element bearing assembly and a rolling-element bearing assembly formed thereby.

RELATED ART

In machine and equipment manufacturing, bearings are used for guiding components which are moveable relative to one another. These bearings allow movements in desired directions and prevent movements in undesired directions. Depending on the operating principle utilized, a distinction is made between sliding and rolling-element bearings. In rolling-element bearings, rolling elements are located between the parts which are moveable with respect to one another.

If a bearing assembly is designed such that it is pre-tensioned in the installed state (operating state), it is important that the rolling elements be secured in a fully-home position (intended installation position, e.g. the terminal ends of the rolling elements abut on the guide flange). Very expensive manufacturing processes are generally needed to ensure that this state is obtained. Indeed, sometimes the arrangement can only be obtained during the assembly of the machine parts or equipment into which the bearing assembly is being incorporated.

The need therefore exists to provide a method for simplifying a manufacturing process of rolling-element bearing assemblies, and/or to reduce the risk of damage to rolling-element bearing assemblies.

SUMMARY OF THE INVENTION

A method for manufacturing a rolling-element bearing assembly according to an exemplary embodiment comprises providing a first bearing ring of a first rolling-element bearing, a second bearing ring of the first rolling-element bearing, and rolling elements of the first rolling-element bearing. The method further includes rotating the first bearing ring of the first rolling-element bearing relative to the second bearing ring of the first rolling-element bearing and joining together or assembling the first bearing ring of the first rolling-element bearing, the second bearing ring of the first rolling-element bearing, and the rolling elements of the first rolling-element bearing while the first bearing ring of the first rolling-element bearing rotates relative to the second bearing ring of the first rolling-element bearing. The method additionally comprises connecting the second bearing ring of the first rolling-element bearing to a bearing ring of a second rolling-element bearing or with a spacer to the bearing ring of the second rolling-element bearing while the first bearing ring of the first rolling-element bearing rotates relative to the second bearing ring of the first rolling-element bearing.

Exemplary embodiments are based on the recognition that, by rotating the bearing rings of a rolling-element bearing of a rolling-element bearing assembly relative to one another, it can be ensured that the rolling elements come to rest in their intended installation position when joining together or assembling the rolling-element bearing and when connecting the rolling-element bearing to a further rolling element bearing of a rolling-element bearing assembly. Due to the rotation during assembly and connection, the rolling elements automatically move into their intended installation positions, so that the risk of damage to the rolling-element bearing caused by a potential tilting, jamming or deforming of the rolling elements can be significantly reduced. Furthermore, the rolling-element bearing assembly can be assembled in a manufacturing process at a bearing manufacturer—assembly need not be delayed until the installation of the rolling-element bearing assembly in the machine part in which it will be used. Thus the manufacturing process can be greatly simplified.

In some exemplary embodiments, the connecting of the second bearing ring of the first rolling-element bearing to the bearing ring of the second rolling element bearing, or with the spacer to the bearing ring of the second rolling-element bearing, is performed such that a clearance-free or play-free connection results. It can thus be ensured that the rolling elements remain in their intended position. In this manner, an optional pre-tensioning of the rolling-element bearing can also be permanently maintained after the completion of the rolling-element bearing assembly process.

To produce a clearance-free connection, the connecting can for example be performed by bonding, clamping and/or adhesion.

Some exemplary embodiments further include providing a first bearing ring of the second rolling-element bearing, a second bearing ring of the second rolling-element bearing, and rolling elements of the second rolling-element bearing and joining together or assembling the first bearing ring of the second rolling-element bearing, the second bearing ring of the second rolling-element bearing, and the rolling elements of the second rolling-element bearing. The second bearing ring of the second rolling-element bearing can be rotated relative to the first bearing ring of the second rolling-element bearing during the joining together or assembly of the second rolling-element bearing and during the connecting to the first rolling-element bearing. It can thus be ensured for both rolling-element bearings of the rolling-element bearing assembly that during joining together and connecting, the rolling elements are in their intended installation position, and the risk of damage to the rolling-element bearing assembly can be significantly reduced.

Some exemplary embodiments relate to a rolling-element bearing assembly which comprises a first rolling-element bearing including an inner ring and an outer ring, and a second rolling element bearing including an inner ring and an outer ring. The inner ring of the first rolling-element bearing is bonded, clamped and/or adhered to the inner ring of the second rolling-element bearing or the inner ring of the first rolling-element bearing is bonded, clamped and/or adhered to a spacer and the spacer is bonded, clamped and/or adhered to the inner ring of the second rolling-element bearing, and/or the outer ring of the first rolling-element bearing may bonded, clamped and/or adhered to the outer ring of the second rolling-element bearing, or the outer ring of the first rolling-element bearing may be bonded, clamped and/or adhered to a spacer, and the spacer may be bonded, clamped and/or adhered to the outer ring of the second rolling-element bearing.

A clearance-free or play-free connection can be produced between the two rolling-element bearings by bonding or adhering the inner rings or outer rings directly or via a spacer, by which clearance-free connection, for example, a predefined pretensioning of the two rolling-element bearings can be ensured after completion of the assembly process.

BRIEF DESCRIPTION OF THE DRAWINGS

Exemplary embodiments of the present invention are explained in more detailed below, with reference to the accompanying figures, wherein.

DETAILED DESCRIPTION

In the following, the same reference numbers can sometimes be used with various described exemplary embodiments for objects, functional units and/or method steps, which have the same or similar functional properties. Furthermore, optional features of the different exemplary embodiments may be combinable or interchangeable with one another.

Figure 1:
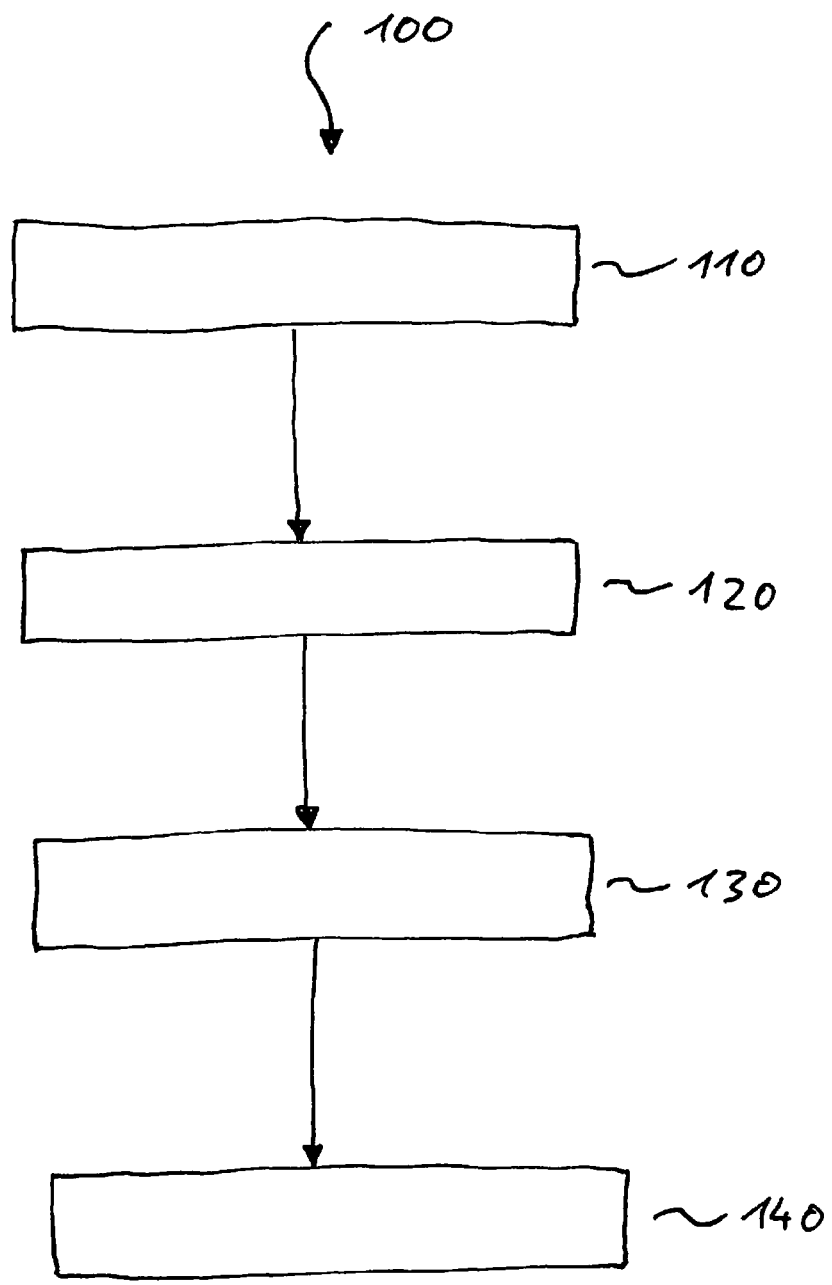
FIG. 1 shows a flowchart of a method for manufacturing a rolling-element bearing assembly.
Figure 2:
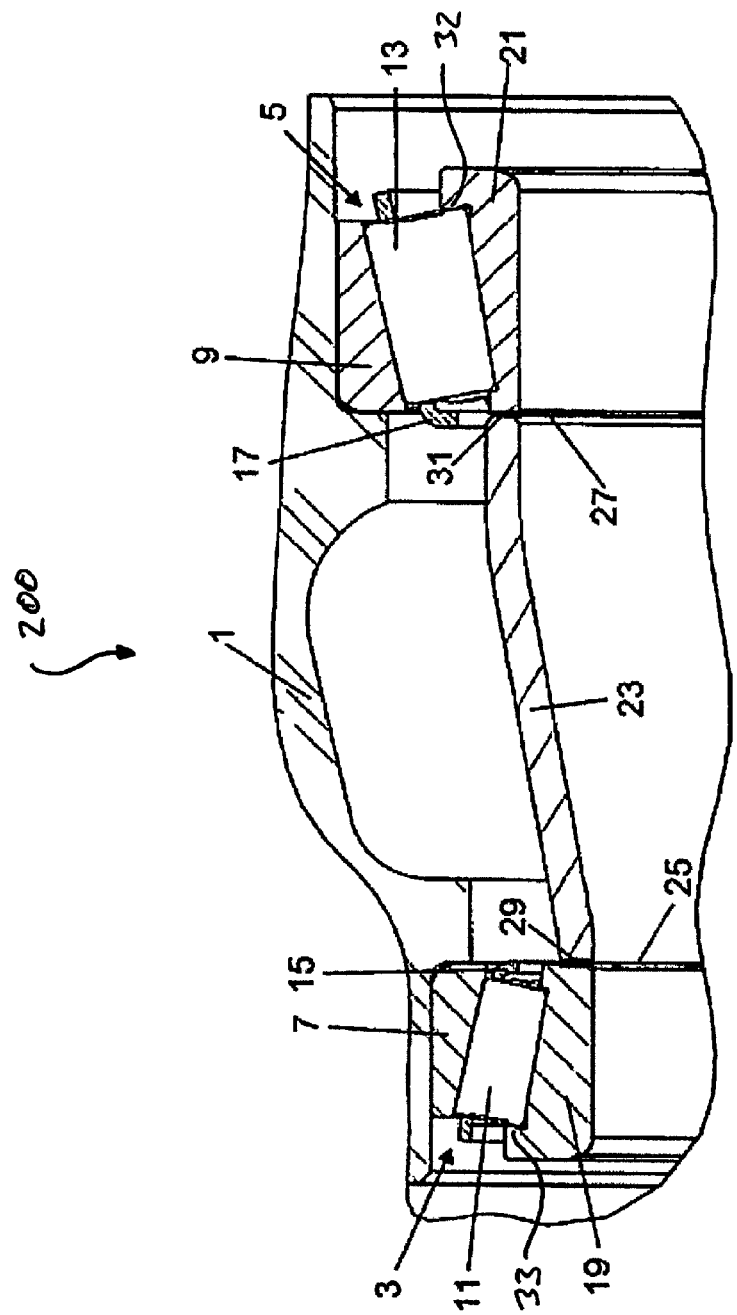
FIG. 2 shows a schematic cross-section through a rolling-element bearing assembly.

FIG. 1 shows a flow diagram of a method 100 for manufacturing a rolling-element bearing assembly according to an exemplary embodiment. To aid in the description of the method 100, FIG. 2 shows a schematic cross-section of a possible rolling-element bearing assembly 200 that can be manufactured using the method 100. The example of FIG. 2, however, is not intended to limit the generality of the described method 100. The method 100 comprises a step 110 of providing a first bearing ring 7 of a first rolling-element bearing 3, a second bearing ring 19 of the first rolling-element bearing 3, and rolling elements 11 of the first rolling-element bearing 3. The method 100 further includes a step 120 of rotating the first bearing ring 7 of the first rolling-element bearing 3 relative to the second bearing ring 19 of the first rolling-element bearing 3, and a step 130 of joining-together or assembling the first bearing ring 7 of the first rolling-element bearing 3, the second bearing ring 19 of the first rolling-element bearing 3, and the rolling elements 11 of the first rolling-element bearing 3 while rotating 120 the first bearing ring 7 of the first rolling-element bearing 3 relative to the second bearing ring 19 of the first rolling-element bearing 3. The method 100 additionally comprises a step 140 of connecting the second bearing ring 19 (or the first bearing ring 7) of the first rolling-element bearing 3 to a bearing ring first bearing ring 9 or second bearing ring 21 of a second rolling-element bearing 5 or with a spacer 23 to the first or second bearing ring 9, 21 of the second rolling-element bearing 5 while rotating 120 the first bearing ring 7 of the first rolling-element bearing 3 relative to the second bearing ring 19 of the first rolling-element bearing 3.

By rotating 120 or turning the first and second bearing rings 7, 19 relative to each other, it can be ensured that during the joining together 130 of the first rolling-element bearing 3 and during the connecting 140 to the second rolling element bearing 5, the rolling elements 11 are in the intended installation position (fully-home position), whereby the risk of damage to the rolling elements 11 or other components of the rolling-element bearing can be significantly reduced during manufacture of the rolling-element bearing assembly 200. In addition, the manufacture of the rolling-element bearing assembly can be greatly simplified, since the joining together of the rolling-element bearing and the connection to the second rolling-element bearing can occur in one manufacturing process, and need not be completed only upon installation of the rolling-element bearing assembly in its intended position in the machine. "Machine" or "machine part" can generally mean any object having parts that are moveable relative to one another, e.g. a motor, an entire vehicle, but also only parts thereof.

The first bearing ring 7 and the second bearing ring 19 can be either an inner ring or an outer ring of a rolling-element bearing. If the first bearing ring is an inner ring, the second bearing ring is an outer ring, and vice versa. For ease of description herein, the first bearing ring 7 is illustrated as being an outer ring while the second bearing ring 19 is shown as an inner bearing ring.

The optional spacer 23 is a component which holds the inner rings 19, 21 of the rolling-element bearing at a predefined axial spacing. In this respect, the spacer 23 can be disposed axially between the inner rings 19, 21. For example, the spacer 23 extends in the axial direction exclusively between the inner rings of the rolling-element bearing.

A rolling-element bearing 3, 5 can for example be a ball bearing, a cylindrical roller bearing, or a tapered roller bearing. The first rolling-element bearing 3 and the second rolling-element bearing 5 can be of the same bearing type or of different bearing types. Likewise, the first rolling-element bearing 3 and the second rolling-element bearing 5 can be of the same or different inner diameter, i.e. different size. Accordingly, the rolling elements can for example be balls, cylinders, or tapered rollers (truncated cones).

During the joining together 130 and the connecting 140, the first bearing ring 7 of the first rolling-element bearing 3 is rotated 120 relative to the second bearing ring 19 of the first rolling-element bearing 3. For this purpose, either the first bearing ring 7 can be rotated and the second bearing ring be substantially stationary relative to the environment (e.g. factory) or vice versa. Alternatively, both bearing rings can rotate relative to each other and relative to the environment. As used herein, describing one bearing ring as rotating relative to another bearing ring is intended to cover any of these operating possibilities.

The joining together 130 and the connecting 140 can occur sequentially or (partially) simultaneously. For example, in the example shown in FIG. 2 for a rolling-element bearing assembly, the inner ring 19 with rolling elements 11 disposed thereon (which are held in position relative to one another e.g. by a cage 15) can be pushed into (or against) the outer ring during the rotating 120, and pressed against the spacer 23 (or also directly against the inner ring 21 of the second rolling-element bearing 5) for the connecting 140.

The connecting 140 of the second bearing ring 19 of the first rolling-element bearing 3 to the second bearing ring 21 of the second rolling-element bearing 5, or to the spacer 23 disposed between the bearing rings of the rolling-element bearing, can for example be performed by bonding or adhering an end surface, extending substantially in the radial direction, of the second bearing ring 19 of the first rolling-element bearing 3 to an end surface, extending substantially in the radial direction, of the second bearing ring 21 of the second rolling-element bearing 5, or to an end surface, extending substantially in the radial direction, of the spacer 23 disposed between the bearing rings of the rolling-element bearing.

FIG. 2 shows further optional, alternative, or additional design details (e.g. cage, guide flange of an inner ring, or hub), which however do not limit the generality of the described method 100.

During the connecting 140, the second bearing ring, which can be an inner ring or an outer ring of the first rolling-element bearing 3, can be connected, directly or via a spacer, to a bearing ring 9 or 21 of a second rolling-element bearing 5, which can also be an inner ring or an outer ring. A spacer can be a one-piece or multi-piece component, which is disposed between the bearing rings of the rolling-element bearing, so that the rolling-element bearings are at a spacing from each other which is desired for the particular application.

In one possible or optional embodiment, even if the outer ring 7 of the first rolling-element bearing 3 can be connected to the inner ring 21 of the second rolling-element bearing 5, or the inner ring 19 of the first rolling-element bearing 3 can be connected to the outer ring 9 of the second rolling-element bearing 5, preferably the inner ring 19 of the first rolling-element bearing 3 is connected to the inner ring 21 of the second rolling-element bearing 5, or the outer ring 7 of the first rolling-element bearing 3 is connected to the outer ring 9 of the second rolling-element bearing 5, either directly or via a spacer 23. In other words, the second bearing ring of the first rolling-element bearing 3 and the bearing ring of the second rolling-element bearing 5, which bearing ring is to be connected thereto directly or via the spacer 23, are for example both inner rings or both outer rings of the respective rolling-element bearing.

The connecting 140 can for example be performed such that a clearance-free or play-free connection results between the second bearing ring 19 of the first rolling-element bearing 3 and the second bearing ring 21 of the second rolling-element bearing 5 or with the spacer 23 to the second bearing ring 21 of the second rolling-element bearing 5. A clearance-free or play-free connection is for example a rigid connection, which allows no relative movement between the connected components. This can be effected for example by bonding or adhering the components to be connected.

In general, the connecting 140 can for example be effected by the use of a clip-ring or another clamping element, which is attached between or on the parts to be connected. Alternatively, the connecting 140 can be effected by permanent connecting methods which are not non-destructively releasable or detachable, such as e.g., by adhering or gluing. For this purpose, adhesive can be applied to one or more of the contact surfaces of one of the bearing rings 7, 19 of the first rolling-element bearing 3, of the one of the bearing ring 9, 21 of the second rolling-element bearing 5, or to the spacer 23. Before the adhesive has started to bond or before it has cured, the components can be pressed against each other during the connecting 140. The adhesive can then be caused to cure e.g. by time, by temperature (heat), and/or by ultraviolet light. In this way for example a clearance-free or play-free connection between the bearing rings 7, 19 of the first rolling-element bearing 3 and the bearing rings 9, 21 of the second rolling-element bearing or the spacer 23 can be achieved.

The method 100 can thus for example additionally or optionally include a step of applying an adhesive to one or more of the contact surfaces of the second bearing ring 19 (e.g. inner ring) of the first rolling-element bearing 3, which contact surface is facing towards the spacer 23, and/or to one of the contact surfaces of the spacer 23 facing towards the second bearing ring 19 of the first rolling-element bearing 3, and/or a step of applying an adhesive to one of the contact surfaces of the spacer 23 facing towards the second bearing ring 21 of the second rolling-element bearing 5, and/or to one of the contact surfaces of the second bearing ring 21 of the second rolling-element bearing 5, which contact surface is facing towards the spacer 23. Further, the connecting 140 can include a pressing-together of the second bearing ring 19 of the first rolling-element bearing 3 and the spacer 23, and simultaneously a pressing-together of the second bearing ring 21 of the second rolling-element bearing 5 and the spacer 23, until the adhesive has cured. A pretensioning of the first rolling-element bearing 3 and the second rolling-element bearing 5, can thereby be achieved, for example.

Alternatively, the respective method steps can also be performed even if the bearing rings of the first rolling-element bearing and of the second rolling-element bearing are directly connected to one another without a spacer.

The rolling-element bearings 3, 5 of the rolling-element bearing assembly 200 can, as shown in FIG. 2, be connected via a spacer 23 between the two inner rings 19, 21. Similarly, the connecting 140 can however also occur for example by a direct connecting of the two inner rings 19, 21 without a spacer 23, or by a direct or indirect (via a spacer) connecting of the outer rings 7, 9 of the rolling-element bearings 3, 5.

During the connecting 140, a pretensioning of the rolling-element bearing can optionally be effected. Depending on the application, a positive or negative operating clearance can be desired for rolling-element bearing arrangements. The operating clearance is the bearing clearance of the installed bearing at normal operating temperatures. "Bearing clearance" here means the amount, with respect to the other bearing ring, by which a bearing ring can be pushed into the other bearing ring in the radial direction or in the axial direction from an end position. With a positive operating clearance, a clearance, albeit small, remains in the bearings during operation. In some cases, however, a negative operating clearance, i.e. a pretensioning, is desired, for example to increase the rigidity of the bearing arrangement or the running or rotational accuracy. Such a pretensioning of the two rolling-element bearings 3, 5 of the rolling-element bearing assembly 200 can be achieved by pressing the to-be-connected parts against one another during the connecting 140, e.g., if the connection is clearance-free. The size (amount) of the pretensioning force can be set by the precise dimensions of the bearing ring to be connected and/or of the optional spacer. If the contact surfaces of the respective components are farther from one another, more force must be applied to press them together during the connecting 140, so that a higher pretensioning force remains than with larger-sized components. In other words, during the connecting 140, the second bearing ring 19 of the first rolling-element bearing 3 and the second bearing ring 21 of the second rolling-element bearing 5, or the second bearing ring 19 of the first rolling-element bearing 3, the spacer 23, and the second bearing ring 21 of the second rolling-element bearing 5 can be pressed onto one another, so that the first rolling-element bearing 3 and the second rolling-element bearing 5 are pretensioned.

As mentioned above, the entire described method can be performed in a (single) continuous manufacturing process at a single location. The rolling-element bearing assembly can therefore, for example, result from the providing of the separate individual parts of the rolling-element bearing (in particular the first bearing ring of the first rolling-element bearing, the second bearing ring of the first rolling-element bearing, and the rolling elements of the first rolling-element bearing), continuing with the rotating 120 to the joining together 130 and connecting 140 of the rolling-element bearing. The rolling-element bearing assembly can then be delivered to a particular customer for further installation in machines or machine parts, such as e.g. motors, transmissions, wheel bearings, entire vehicles, or similar. The customer can then, for example, omit the connecting of the rolling-element bearing during the installation of the rolling-element bearing assembly because the connected rolling-element bearing assembly has been delivered fully assembled.

Optionally a similar method can be performed with the second rolling-element bearing 5 as with the first rolling-element bearing 3. Thus the method 100 can optionally comprise a step of providing a first bearing ring 9 of the second rolling-element bearing 5, a second bearing ring 21 of the second rolling-element bearing 5, and rolling elements 13 of the second rolling-element bearing 5. In this case, either the first bearing ring or the second bearing ring of the second rolling-element bearing 5 can be the particular bearing ring of the second rolling element bearing which, in the further course of performing the method, is connected 140 to the second bearing ring 19 of the first rolling-element bearing 3, either directly or via a spacer 23.

Further, the method can additionally include a step of joining together the first bearing ring 9 of the second rolling-element bearing 5, the second bearing ring 21 of the second rolling-element bearing 5, and the rolling elements 13 of the second rolling-element bearing 5.

The bearing rings 9, 21 of the second rolling-element bearing 5 can also optionally rotate relative to each other during the joining together. It can thus be also ensured for the second rolling-element bearing 5 that the rolling elements are in the intended installation position while the rolling-element bearing 5 is joined together and connected to the first rolling-element bearing 3. In other words, the method can optionally comprise a step of rotating the second bearing ring 21 of the second rolling-element bearing 5 relative to the first bearing ring 9 of the second rolling-element bearing 5. In this case, the joining together of the second rolling-element bearing 5 and the connecting 140 occur during the rotating of the first bearing ring 9 of the second rolling-element bearing 5 relative to the second bearing ring 21 of the second rolling-element bearing 5.

The rotational speeds here of the bearing rings of the rolling element bearing can optionally be the same or approximately equal. In other words, the first bearing ring 7 of the first rolling-element bearing 3 can rotate relative to the second bearing ring 19 of the first rolling-element bearing 3 with a first rotational speed during the connecting 140, and the first bearing ring 9 of the second rolling-element bearing 5 can rotate relative to the second bearing ring 21 of the second rolling-element bearing 5 with a second rotational speed during the connecting 140. The rotational speeds can be chosen here such that a difference in speed between the first rotational speed and the second rotational speed is less than 5 percent (or less 2%, 1%, or 0.1%) of the first rotational speed, or such that there is substantially no speed difference.

Alternatively, depending on manufacturing conditions or due to the orientation of the rolling-element bearing assembly during the joining together 130 and the connecting 140, a step of rotating the bearing rings 9, 21 of the second rolling-element bearing 5 relative to each other may not be necessary. For example, the rolling elements 13 of the second rolling-element bearing 5 in an O-arrangement of the rolling-element bearing assembly can, as shown in FIG. 2, automatically slide into their intended installation position (e.g. by abutting on the guide flange of the inner ring), if the second rolling-element bearing 5 is disposed lower than the first rolling-element bearing 3 (i.e., if the second rolling-element bearing 5 is disposed closer to the center of the Earth than the rolling-element bearing 3) during joining together 130 and connecting 140. In other words, during the connecting 140, the second bearing ring 21 of the second rolling-element bearing 5 can also undergo substantially no rotational movement (or a rotational speed of less than 5%, 2%, or 1% of the rotational speed of the bearing rings of the first rolling-element bearing) relative to the first bearing ring 9 of the second rolling-element bearing 5, if during the connecting 140 the rolling-element bearing assembly 200 is oriented such that during the connecting 140 the rolling elements 13 of the second rolling-element bearing 5 are oriented in their intended installation position due to the gravitational force, or are pulled into their intended installation position by the gravitational force. In other words, for example a rolling-element bearing of the rolling-element bearing assembly 200, which rolling-element bearing is part of an O-arrangement, can be oriented such that its axis of rotation is substantially parallel to the gravitational field, and it is located closer to the center of the Earth than (i.e. below) the other rolling-element bearing of the O-arrangement. Then a step of rotating the bearing rings of this rolling-element bearing relative to each other can be omitted, since the rolling elements automatically slide against the guide flange of the inner ring.

As was described above and as also shown in FIG. 2, the method 100 can be used for example to manufacture a rolling-element bearing assembly 200, wherein the first rolling-element bearing 3 and the second rolling-element bearing 5 are tapered roller bearings, which are disposed in an O-arrangement in the rolling-element bearing assembly 200. In an O-arrangement, the rolling elements in both rolling-element bearings are oriented such that a cross-sectional plane lying orthogonal to an axis of rotation of each rolling element of a rolling-element bearing intersects the axis of rotation of the rolling-element bearing on a side facing away from the other rolling-element bearing of the O-arrangement. Conversely, the cross-sectional plane of the rolling elements intersects the axis of rotation of the rolling-element bearing in an X-arrangement on a side of the rolling-element bearing facing towards the second rolling-element bearing of the X-arrangement.

Further, the first rolling-element bearing 3 and the second rolling-element bearing 5 can have different inner diameters.

The rolling-element bearing assembly 200 shown in FIG. 2 includes further optional, alternative, or additional designs, which can be manufactured individually or in any combination by corresponding method steps when performing the method 100. Thus, for example, for each rolling-element bearing, FIG. 2 shows a cage 15, 17 for guiding the rolling elements 11, 13, inner rings 19, 21 having guide flange 32, 33 and/or a hub 1 (wheel hub), which is connected to the outer rings of the rolling-element bearing. In addition, the contact points 29, 31 of the inner rings 19, 21 with the spacer 23 are marked in cross-section, as well as the view of the extension of the contact points 25, 27 around the inner circumference of the rolling-element bearing assembly 200. These contact surfaces are for example adhered to one another.

A method according to the described concept can for example generally also be defined as follows. A method 100 for manufacturing a rolling-element bearing assembly 200 comprises a step 110 of providing an outer ring 7 of a first rolling-element bearing 3, an inner ring 19 of the first rolling-element bearing 3, and rolling elements 11 of the first rolling element bearing 3. The method 100 further comprises a step 120 of rotating the inner ring 19 of the first rolling-element bearing 3 relative to the outer ring 7 of the first rolling-element bearing 3 and a step 130 of joining together of the outer ring 7 of the first rolling-element bearing 3, the inner ring 19 of the first rolling-element bearing 3, and the rolling elements 11 of the first rolling-element bearing 3 during the rotating 120 of the inner ring 19 of the first rolling-element bearing 3 relative to the outer ring 7 of the first rolling-element bearing 3. The method 100 additionally comprises a step 140 of connecting the inner ring 19 of the first rolling-element bearing 3 to an inner ring 21 of a second rolling-element bearing 5 or with a spacer 23 to the inner ring 21 of the second rolling-element bearing 5 during the rotating 120 of the inner ring 19 of the first rolling-element bearing 3 relative to the outer ring 7 of the first rolling-element bearing 3, or a step 140 of connecting the outer ring 7 of the first rolling-element bearing 3 to an outer ring 9 of the second rolling-element bearing 5 or with a spacer to the outer ring 9 of the second rolling-element bearing 5 during the rotating 120 of the inner ring 19 of the first rolling-element bearing 3 relative to the outer ring 7 of the rolling-element bearing 3.

FIG. 2 shows a schematic cross-section of a rolling-element bearing assembly 200 according to an exemplary embodiment. The rolling-element bearing assembly 200 comprises a first rolling-element bearing 3 including an inner ring 19 and an outer ring 7 and a second rolling-element bearing 5 including an inner ring 21 and an outer ring 9. The inner ring 19 of the first rolling-element bearing 3 is bonded and/or adhered to the inner ring 21 of the second rolling element bearing 5, the inner ring 19 of the first rolling-element bearing 3 is bonded and/or to a spacer 23, and the spacer 23 to the inner ring 21 of the second rolling-element bearing 5, and/or the outer ring 7 of the first rolling element bearing 3 is bonded and/or adhered to the outer ring 9 of the second rolling-element bearing 5, or the outer ring 7 of the first rolling-element bearing 3 is bonded and/or adhered to a spacer and the spacer to the outer ring 9 of the second rolling-element bearing 5.

A clearance-free connection can be produced by the bonding, so that the two rolling-element bearings 3, 5 can be delivered in pretensioned state. However, if the rolling-element bearings had been connected with, for example, a clip-ring, a clearance-free connection would be difficult or impossible to realize, and the rolling-element bearings of the rolling-element bearing assembly could usually only be effected upon installation in the machine part or the machine provided for the rolling-element bearing assembly, so that the entire manufacturing process of the rolling-element bearing assembly would have taken place in at least two independent partial-processes.

Structural embodiment variants that are optional, alternative, or additional to the above-described rolling-element bearing assembly 200 correspondingly apply to the above-described method for manufacturing a rolling-element bearing assembly.

The first rolling-element bearing 3 and the second rolling-element bearing 5 can thus for example be tapered roller bearings, which are disposed in the rolling-element bearing assembly 200 in an O-arrangement or in an X-arrangement.

Likewise, the inner ring 19 of the first rolling-element bearing 3 can optionally be clearance-free connected to the inner ring 21 of the second rolling-element bearing 5 or with the spacer 23 to the inner ring 21 of the second rolling-element bearing 5, wherein the first rolling-element bearing 3 and the second rolling-element bearing 5 are pretensioned.

Further, the inner diameter of the first rolling-element bearing 3 and the inner diameter of the second rolling-element bearing 5 can be different (but they can also be the same).

The embodiments already discussed with reference to FIG. 2, for example, also apply to further optional, additional, or alternative embodiments.

Some exemplary embodiments relate to a wheel bearing including a rolling-element bearing assembly corresponding to the above-described concept. In this case, for example, the outer ring 7 of the first rolling-element bearing 3 and the outer ring 9 of the second rolling-element bearing 5 are clearance-free connected to a wheel hub 1.

Some exemplary embodiments relate to a rolling-element bearing assembly or a method for manufacturing a rolling-element bearing assembly, wherein the rollers (rolling elements) are located in an intended installation position (fully-home position) of the bearing assembly. For example, a fully-home position of the rollers can be achieved in bearing assemblies whose inner components of the inner bracing circle are bonded. In order that they (the rolling elements) reach or substantially reach their position without damaging the components, the inner ring can be rotated relative to the outer ring and thereby drive the rollers. This occurs, for example, when bonding the inner rings together.

The described method can be used, for example, for bearing assemblies including individual bearings (e.g. as shown in FIG. 2), but also for bearing units (wherein the outer rings are directly connected to each other). Likewise, the method can be used, for example, for bearing units which are in a pretensioned configuration when in a condition for delivery. In these arrangements, for example, once raceways and rolling elements are in contact, there is a gap between the inner rings 19, 21 or between inner ring and spacer 23. For example, the adhesive is located here. For example, the outer ring 7 or the hub 1 can now be turned or rotated, as long as the adhesive has not yet started to cure. The rollers move to the guide flange, then for example the inner rings are placed on a block and the adhesive (at the positions 25, 27) can cure.

For example a damage-free product can be manufactured using the described concept, wherein adhesive can be used as a substitute for a clip-ring.

The features disclosed in the foregoing description, in the claims that follow, and in the drawings can be relevant or significant individually, as well as in any combination, to the realization of the invention in its various embodiments.

Although some aspects of the present invention have been described in the context of a device, it is to be understood that these aspects also represent a description of a corresponding method, so that a block or a component of a device is also understood as a corresponding method step or as a characteristic of a method step, for example a method for manufacturing or operating bearing. In an analogous manner, aspects which have been described in the context of or as a method step also represent a description of a corresponding block or detail or feature of a corresponding device.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing devices and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The above-described exemplary embodiments represent only an illustration of the principles of the present invention. It is understood that modifications and variations of the arrangements and details described herein will be clear to other persons of skill in the art. It is therefore intended that the invention be limited only by the scope of the following patent claims, and not by the specific details which have been presented with reference to the description and the explanation of the exemplary embodiments.

REFERENCE NUMBER LIST

1 Hub, wheel hub
3 First rolling-element bearing
5 Second rolling-element bearing
7 Outer ring of the first rolling-element bearing
9 Outer ring of the second rolling-element bearing
11 Rolling elements of the first rolling-element bearing
13 Rolling elements of the second rolling-element bearing
15 Cage of the first rolling-element bearing
17 Cage of the second rolling-element bearing
19 Inner ring of the first rolling-element bearing
21 Inner ring of the second rolling-element bearing
23 Spacer
25 Plan view of the adhesive location between inner ring of the first rolling-element bearing and spacer
27 Plan view of the adhesive location between inner ring of the second rolling-element bearing and spacer
29 Cross-section of the adhesive surface between inner ring of the first rolling-element bearing and spacer
31 Cross-section of the adhesive surface between inner ring of the second rolling-element bearing and spacer
32 Guide flange of the inner ring of the second rolling-element bearing
33 Guide flange of the inner ring of the first rolling-element bearing
100 Method for manufacturing a rolling-element bearing assembly
110 Method step Providing
120 Method step Rotating
130 Method step Joining together
140 Method step Connecting
200 Rolling-element bearing assembly

What is claimed is:

1. A method for manufacturing a rolling-element bearing assembly, comprising:
    providing a first bearing ring having a first rolling-element bearing of a cylindrical configuration, a second bearing ring of the first rolling-element bearing, and rolling elements of the first rolling-element bearing; rotating the first bearing ring of the first rolling-element bearing relative to the second bearing ring of the first rolling-element bearing;
    joining together the first bearing ring of the first rolling-element bearing, the second bearing ring of the first rolling-element bearing and the rolling elements of the first rolling-element bearing while the first bearing ring of the first rolling-element bearing is rotating relative to the second bearing ring of the first rolling-element bearing; and
    connecting the second bearing ring of the first rolling-element bearing to a bearing ring of a second rolling-element bearing with a spacer disposed between the second bearing ring of the first rolling-element bearing and the bearing ring of the second rolling-element bearing by bonding while the first bearing ring of the first rolling-element bearing is rotating relative to the second bearing ring of the first rolling-element bearing, wherein the first bearing ring and the second bearing ring are rotated relative to each other and relative to an assembly line wherein joining and connecting occur sequentially or simultaneously wherein the second inner ring with rolling-elements disposed thereon and held by a cage are pushed into the first bearing ring during rotation, and pressed against the spacer to be connected.

2. The method according to claim 1, wherein the connecting of the second bearing ring of the first rolling-element bearing to the bearing ring of the second rolling-element bearing with the spacer to the bearing ring of the second rolling-element bearing occurs such that a clearance-free connection results between the second bearing ring of the first rolling-element bearing and the spacer to the bearing ring of the second rolling-element bearing.

3. The method according to claim 1, wherein the connecting of the second bearing ring of the first rolling-element bearing to the bearing ring of the second rolling-element bearing with a spacer disposed between the bearing rings of the rolling-element bearing by bonding a substantially radially extending end surface of the second bearing ring of the first rolling-element bearing to a substantially radially extending end surface of the spacer which is disposed between the bearing rings of the first rolling-element bearing.

4. The method according to claim 1, wherein during the connecting, the second bearing ring of the first rolling-element bearing and the bearing ring of the second rolling-element bearing or the second bearing ring of the first rolling-element bearing, the spacer, and the bearing ring of the second rolling-element bearing are pressed against one another, so that the first rolling-element bearing and the second rolling-element bearing are pretensioned.

5. The method according to claim 1, wherein the first bearing ring of the first rolling-element bearing, the second bearing ring of the first rolling-element bearing and the rolling elements of the first rolling-element bearing are provided as separate components.

6. The method according to claim 1, wherein the second rolling-element bearing includes the bearing ring, a second bearing ring, and rolling elements, the method further including: joining together the bearing ring of the second rolling-element bearing, the second bearing ring of the second rolling-element bearing, and the rolling elements of the second rolling-element bearing.

7. The method according to claim 6, including: rotating the bearing ring of the second rolling-element bearing relative to the second bearing ring of the second rolling-element bearing, wherein the joining together of the second rolling-element bearing and the connecting occur while the bearing ring of the second rolling-element bearing is rotating relative to the second bearing ring of the second rolling-element bearing.

8. The method according to claim 7, wherein during the connecting, the first bearing ring of the first rolling-element bearing rotates relative to the second bearing ring of the first rolling-element bearing at a first rotational speed, and the bearing ring of the second rolling-element bearing rotates relative to the second bearing ring of the second rolling-element bearing at a second rotational speed, wherein a difference between the first rotational speed and the second rotational speed is less than 5% of the first rotational speed.

9. The method according to claim 6, including orienting the rolling-element bearing assembly during the connecting such that, during the connecting, the rolling elements of the second rolling-element bearing are positioned into their intended installation position by a gravitational force, wherein during the connecting, the bearing ring of the second rolling-element bearing undergoes substantially no rotational movement relative to the second bearing ring of the second rolling-element bearing.

10. The method according to claim 6, wherein the first rolling-element bearing and the second rolling-element bearing are tapered roller bearings which are disposed in an O-arrangement in the rolling-element bearing assembly, and wherein the first rolling-element bearing and the second rolling-element bearing have different inner diameters.

11. The method according to claim 1, wherein the spacer extends in the axial direction exclusively between the second bearing ring of the first rolling-element bearing and the bearing ring of the second rolling-element bearing.

12. The method according to claim 1, wherein the bonding comprises a bonding using an adhesive.

* * * * *